United States Patent
Falik et al.

[19]

[11] Patent Number: 6,065,078
[45] Date of Patent: May 16, 2000

[54] MULTI-PROCESSOR ELEMENT PROVIDED WITH HARDWARE FOR SOFTWARE DEBUGGING

[75] Inventors: Ohad Falik, Sunnyvale, Calif.; Ophir Shabtay, Haifa, Israel; Gideon Intrater, Sunnyvale, Calif.; Tzvia Weisman, Shoham, Israel

[73] Assignee: National Semiconductor Corporation, Santa Clara, Calif.

[21] Appl. No.: 09/096,402

[22] Filed: Jun. 11, 1998

Related U.S. Application Data

[63] Continuation-in-part of application No. 08/813,501, Mar. 7, 1997, Pat. No. 5,964,853.
[60] Provisional application No. 60/051,943, Jul. 8, 1997.
[51] Int. Cl.[7] ........................................ G06F 13/00
[52] U.S. Cl. ................ 710/100; 714/25; 714/27; 714/30; 714/31; 714/34; 714/38; 714/40; 714/46; 714/47; 709/221; 700/17; 370/402; 370/244; 371/15.1; 371/20.1
[58] Field of Search .......................... 710/100; 714/25, 714/30, 31, 40, 27, 47, 38, 46, 34; 371/15.1, 20.1; 370/402, 244; 709/221, 102; 700/17

[56] References Cited

U.S. PATENT DOCUMENTS

| | | | |
|---|---|---|---|
| 4,701,845 | 10/1987 | Andreasen et al. | 714/31 |
| 5,179,702 | 1/1993 | Spix et al. | 709/102 |
| 5,193,179 | 3/1993 | Laprade et al. | 395/575 |
| 5,274,797 | 12/1993 | Barlow et al. | 714/46 |
| 5,357,519 | 10/1994 | Martin et al. | 371/15.1 |
| 5,600,788 | 2/1997 | Lofgren et al. | 714/31 |
| 5,617,420 | 4/1997 | Whetsel | 370/402 |
| 5,619,409 | 4/1997 | Schultz et al. | 700/17 |
| 5,630,049 | 5/1997 | Cardoza et al. | 714/25 |
| 5,636,203 | 6/1997 | Shah | 370/244 |
| 5,737,516 | 4/1998 | Circello et al. | 714/38 |
| 5,841,991 | 11/1998 | Russel | 709/221 |
| 5,864,563 | 1/1999 | Ratcliffe | 371/20.1 |
| 5,884,023 | 3/1999 | Swoboda et al. | 714/30 |
| 5,951,696 | 9/1999 | Naaseh et al. | 714/34 |

*Primary Examiner*—Ayaz R. Sheikh
*Assistant Examiner*—Frantz Blanchard Jean
*Attorney, Agent, or Firm*—Limbach & Limbach L.L.P.

[57] ABSTRACT

A multiprocessor system includes a plurality of processors. A debugger interface includes interface circuitry to interface the plurality of processors to a debugger. The debugger interface includes means for receiving a debugger command from the debugger. Debugger command directing means determines from the debugger command for which of at least one of the plurality of processors the debugger command is intended, directs the debugger command, via the interface circuitry to the at least one intended processor. A processor command is received from one of the plurality of processors, and processor command directing means directs the processor command, received from the one processor, via the interface circuitry to the debugger. The system is especially suited for debugging software that is executing on the plurality of processors of the multiprocessor system.

22 Claims, 11 Drawing Sheets

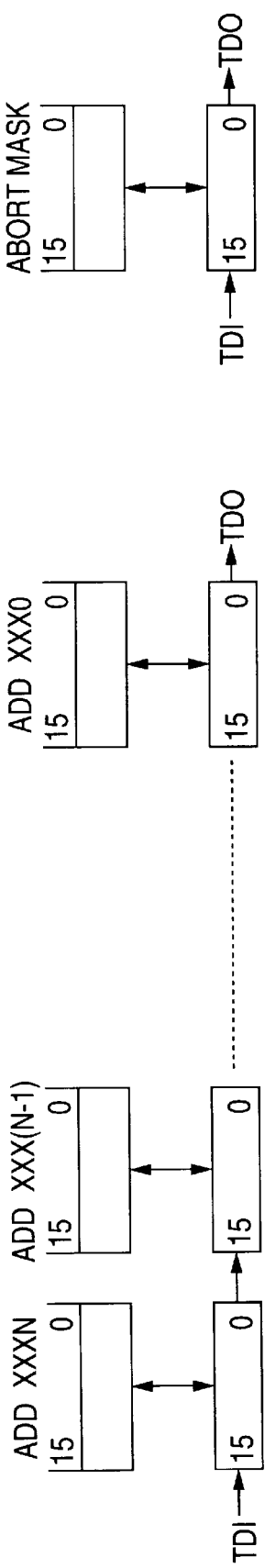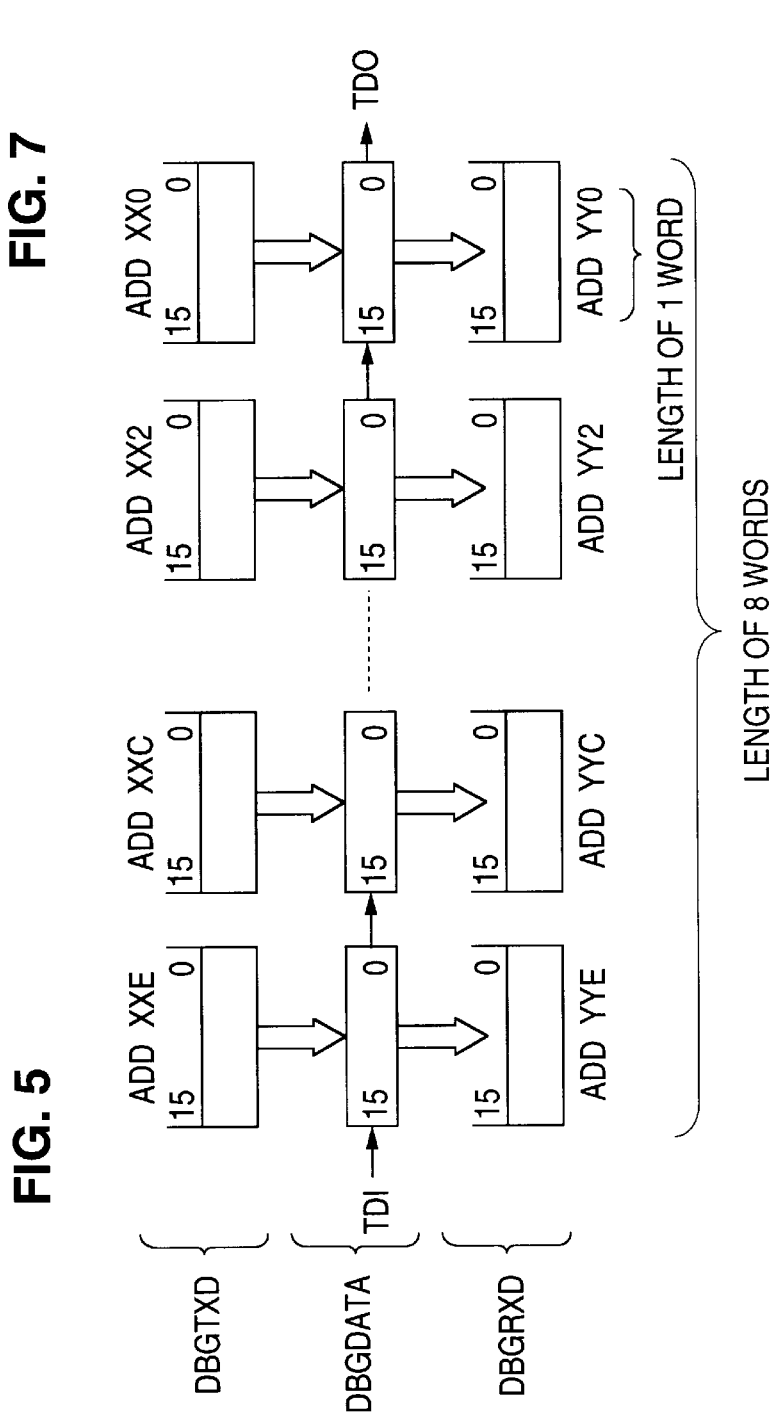

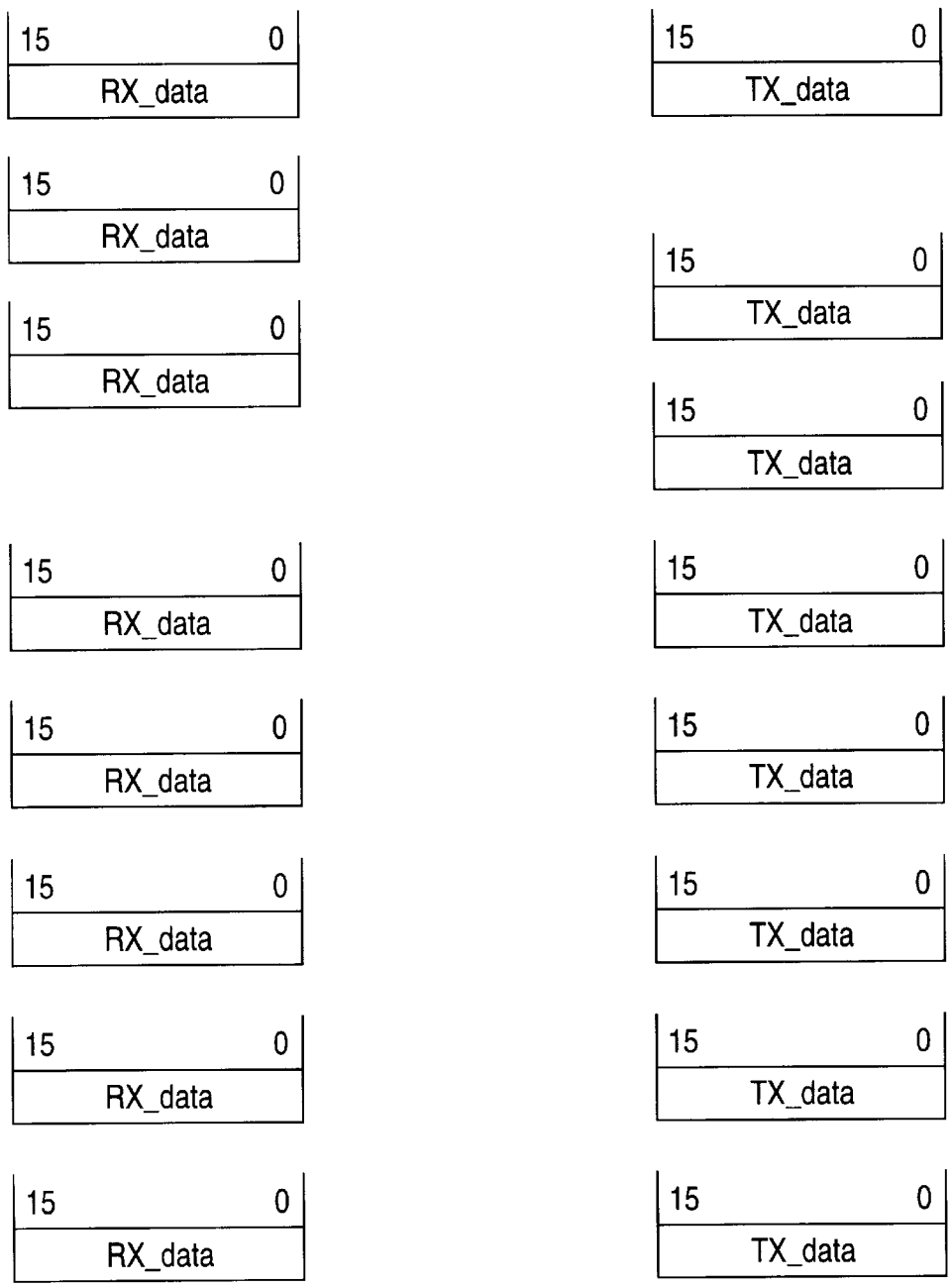
FIG. 8  FIG. 10
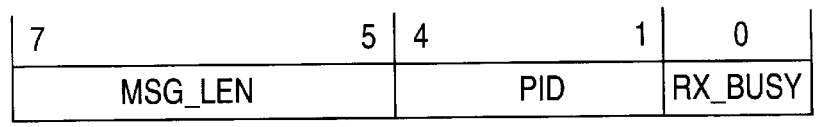
FIG. 9

FIG. 11

| 7 | | | | 4 | 3 | | | 0 |
|---|---|---|---|---|---|---|---|---|
| RESERVED | | | | | PID | | | |

FIG. 12

| 7 | | | | 3 | 2 | | 0 |
|---|---|---|---|---|---|---|---|
| RESERVED | | | | | MSG-LEN | | |

FIG. 13

| 7 | | | | | 1 | 0 |
|---|---|---|---|---|---|---|
| RESERVED | | | | | | ASSERT |

FIG. 14

| 15 | 8 | 7 | 6 | 5 | 4 | 3 | 2 | 1 | 0 |
|----|---|---|---|---|---|---|---|---|---|
| RESERVED | | ResP_7 | ResP_6 | ResP_5 | ResP_4 | ResP_3 | P_2 | P_1 | P_0 |

FIG. 15

| 7 | 6 | 5 | 4 | 3 | 2 | 1 | 0 |
|---|---|---|---|---|---|---|---|
| res ABORT_3 | res Rx_3 | ABORT_2 | RX_2 | ABORT_1 | RX_1 | ABORT_0 | RX_0 |

| 15 | 14 | 13 | 12 | 11 | 10 | 9 | 8 |
|----|----|----|----|----|----|---|---|
| res ABORT_7 | res RX_7 | res ABORT_6 | res RX_6 | res ABORT_5 | res RX_5 | res ABORT_4 | res RX_4 |

| | REGISTER NAME | SIZE | ADDRESS | ACCESS TYPE | VALUE AFTER RESET |
|---|---|---|---|---|---|
| DEBUGGER I/F | DBGRXD0 | Word | FFFF E100$_{16}$ | R | |
| | DBGRXD2 | Word | FFFF E104$_{16}$ | R | |
| | DBGRXD4 | Word | FFFF E108$_{16}$ | R | |
| | DBGRXD6 | Word | FFFF E10C$_{16}$ | R | |
| | DBGRXD8 | Word | FFFF E110$_{16}$ | R | |
| | DBGRXD10 | Word | FFFF E114$_{16}$ | R | |
| | DBGRXD12 | Word | FFFF E118$_{16}$ | R | |
| | DBGRXD14 | Word | FFFF E11C$_{16}$ | R | |
| | DBGTXD0 | Word | FFFF E120$_{16}$ | R/W | |
| | DBGTXD2 | Word | FFFF E124$_{16}$ | R/W | |
| | DBGTXD4 | Word | FFFF E128$_{16}$ | R/W | |
| | DBGTXD6 | Word | FFFF E12C$_{16}$ | R/W | |
| | DBGTXD8 | Word | FFFF E130$_{16}$ | R/W | |
| | DBGTXD10 | Word | FFFF E134$_{16}$ | R/W | |
| | DBGTXD12 | Word | FFFF E138$_{16}$ | R/W | |
| | DBGTXD14 | Word | FFFF E13C$_{16}$ | R/W | |
| | DBGRXST | Byte | FFFF E140$_{16}$ | R/W | 0 |
| | DBGTXST | Byte | FFFF E144$_{16}$ | R/W | 0 |
| | DBGTXLOC | Byte | FFFF E148$_{16}$ | R/W | 0x0F |
| | DBGTINT | Byte | FFFF E14C$_{16}$ | Wy | |
| | DBGABORT | Word | FFFF E150$_{16}$ | W | |
| | DBGISESRCA | Word | FFFF E154$_{16}$ | R/W | 0 |

FIG. 16

| DEBUGGER INTERFACE REGISTERS | 13 6 | 7 | 6 | 5 | 4 | 3 | 2 | 1 | 0 |
|---|---|---|---|---|---|---|---|---|---|
| DBGRXD0 | colspan="9" | RX_Data0 ||||||||
| DBGRXD2 | colspan="9" | RX_Data2 ||||||||
| DBGRXD4 | colspan="9" | RX_Data4 ||||||||
| DBGRXD6 | colspan="9" | RX_Data6 ||||||||
| DBGRXD8 | colspan="9" | RX_Data8 ||||||||
| DBGRXD10 | colspan="9" | RX_Data10 ||||||||
| DBGRXD12 | colspan="9" | RX_Data12 ||||||||
| DBGRXD14 | colspan="9" | RX_Data14 ||||||||
| DBGTXD0 | colspan="9" | TX_Data0 ||||||||
| DBGTXD2 | colspan="9" | TX_Data2 ||||||||
| DBGTXD4 | colspan="9" | TX_Data4 ||||||||
| DBGTXD6 | colspan="9" | TX_Data6 ||||||||
| DBGTXD8 | colspan="9" | TX_Data8 ||||||||
| DBGTXD10 | colspan="9" | TX_Data10 ||||||||
| DBGTXD12 | colspan="9" | TX_Data12 ||||||||
| DBGTXD14 | colspan="9" | TX_Data14 ||||||||
| DBGRXST | | MSG_LEN ||| PID ||| RX_BUSY |
| DBGTXST | | RESERVED ||| MSG_LEN ||||
| DBGTXLOC | | RESERVED |||| PID ||||
| DBGTINT | | RESERVED ||||||| ASSERT |
| DBGABORT | | RESERVED |||||| P_2 | P_1 | P_0 |
| DBGISESRCA | | RESERVED ISE & ABORT (3-14) | ABORT_2 RX_3 | RX_2 | ABORT_1 | RX_1 | ABORT_0 | RX_0 |

FIG. 17

MULTI-PROCESSOR ELEMENT PROVIDED WITH HARDWARE FOR SOFTWARE DEBUGGING

CROSS-REFERENCE TO RELATED APPLICATIONS

This application claims priority from provisional application no. 60/051,943 filed Jul. 8, 1997 U.S. Pat. No. 5,964,853 and from non-provisional application no. 08/813,501 filed Mar. 7, 1997.

TECHNICAL FIELD

The present invention relates to multi-processor integrated circuits and, in particular, to a multi-processor integrated circuit that includes hardware especially suited for software that is executing on the various processor cores of the multiprocessor integrated circuit.

BACKGROUND

Multiprocessor integrated circuits are known in the art. An integrated development environment is required to conveniently and reliably debug programs that are being simultaneously executed by all of the processors. Most conventional multiprocessor integrated circuits accomplish this by providing a separate interface to each processor "core". For debugging, each core is provided with a separate debugger that integrates with the core via its separate interface. In such an environment, it is particularly difficult to debug problems that occur as a result of some interaction between the cores.

SUMMARY

A multiprocessor system includes a plurality of processors. A debugger interface includes interface circuitry to interface the plurality of processors to a debugger. The debugger interface includes means for receiving a debugger command from the debugger. Debugger command directing means determines from the debugger command for which of at least one of the plurality of processors the debugger command is intended, directs the debugger command, via the interface circuitry to the at least one intended processor. A processor command is received from one of the plurality of processors, and processor command directing means directs the processor command, received from the one processor, via the interface circuitry to the debugger. The system is especially suited for debugging software that is executing on the plurality of processors of the multiprocessor system.

BRIEF DESCRIPTION OF THE FIGURES

FIG. 5 shows the bit allocation for a parallel load operation between any pair of serial shift registers and a peripheral bus addressable register.

FIG. 6 illustrates a parallel load data scheme among the DBGTXT, DBGDATA, and DBGRXD registers of the test access port of FIG. 2.

FIG. 7 illustrates the interface to the ABORT_MASK register.

FIG. 8 illustrates the format of the DBGRXD registers of the RX data link of FIG. 1.

FIG. 9 illustrates the register formats of the DBGRXST registers of the RX data link of FIG. 1.

FIG. 10 illustrates the formats of the DBGTXD registers of the TX data link of FIG. 1.

FIG. 11 illustrates the formats of the DBGTXLOC registers of the TX data link of FIG. 1.

FIG. 12 illustrates the format of the DBGTXST register of the TX data link of FIG. 1.

FIG. 13 illustrates the format of the DBGTINT register of the test access port shown in FIG. 1.

FIG. 14 shows the format of the DBGABORT of the ISE interrupt control circuit of FIG. 1.

FIG. 15 illustrates the format of the DBGISESCRA register of the ISE interrupt control circuit of FIG. 1.

FIG. 16 summarizes all of the registers of the debugger interface module of FIG. 1.

FIG. 17 shows the layout of the registers of the debugger interface module of FIG. 1.

DETAILED DESCRIPTION

Figure 18:
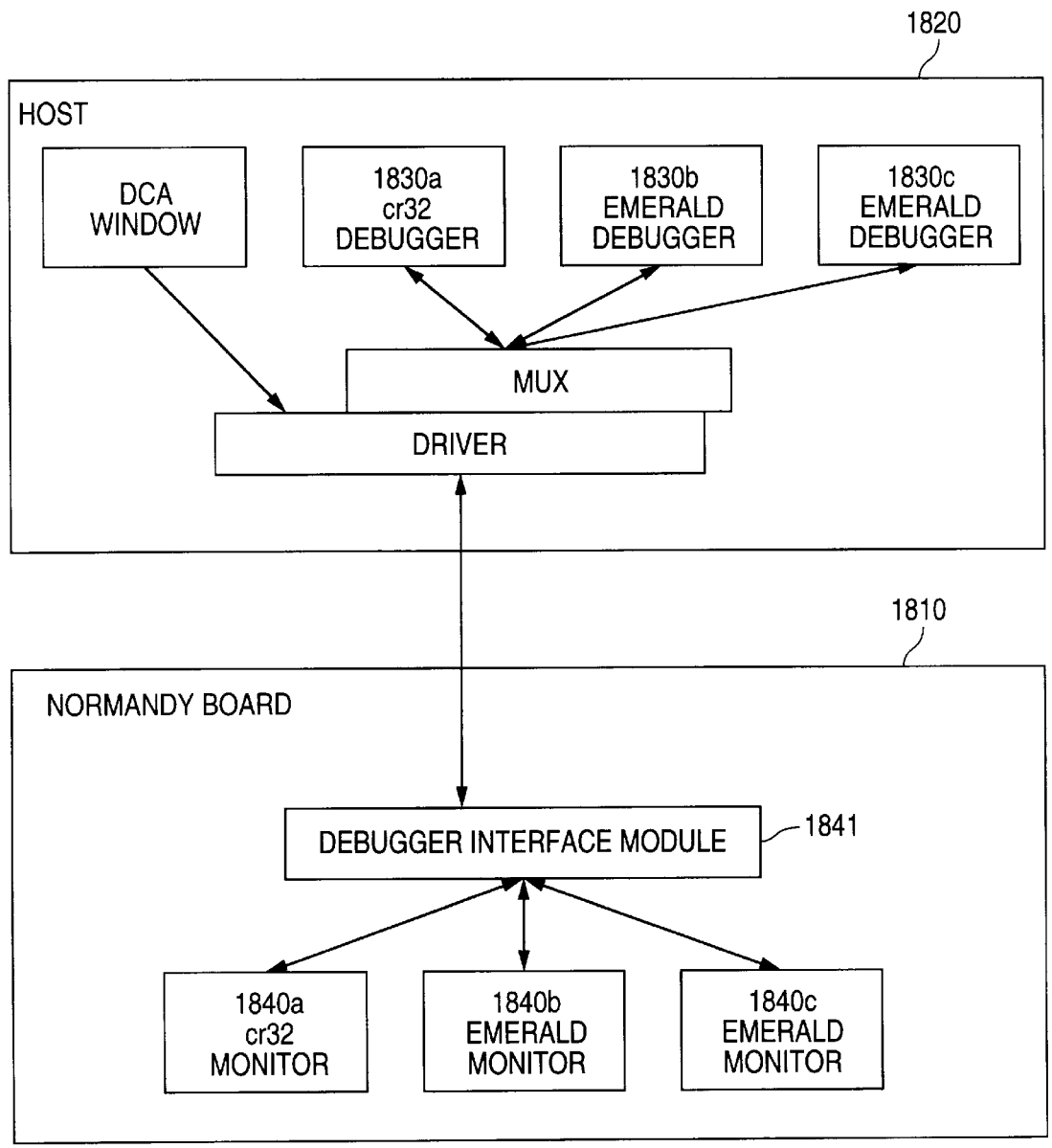
FIG. 18 illustrates the overall architecture of a multiprocessor system in accordance with an embodiment of the present invention.
Figure 19:
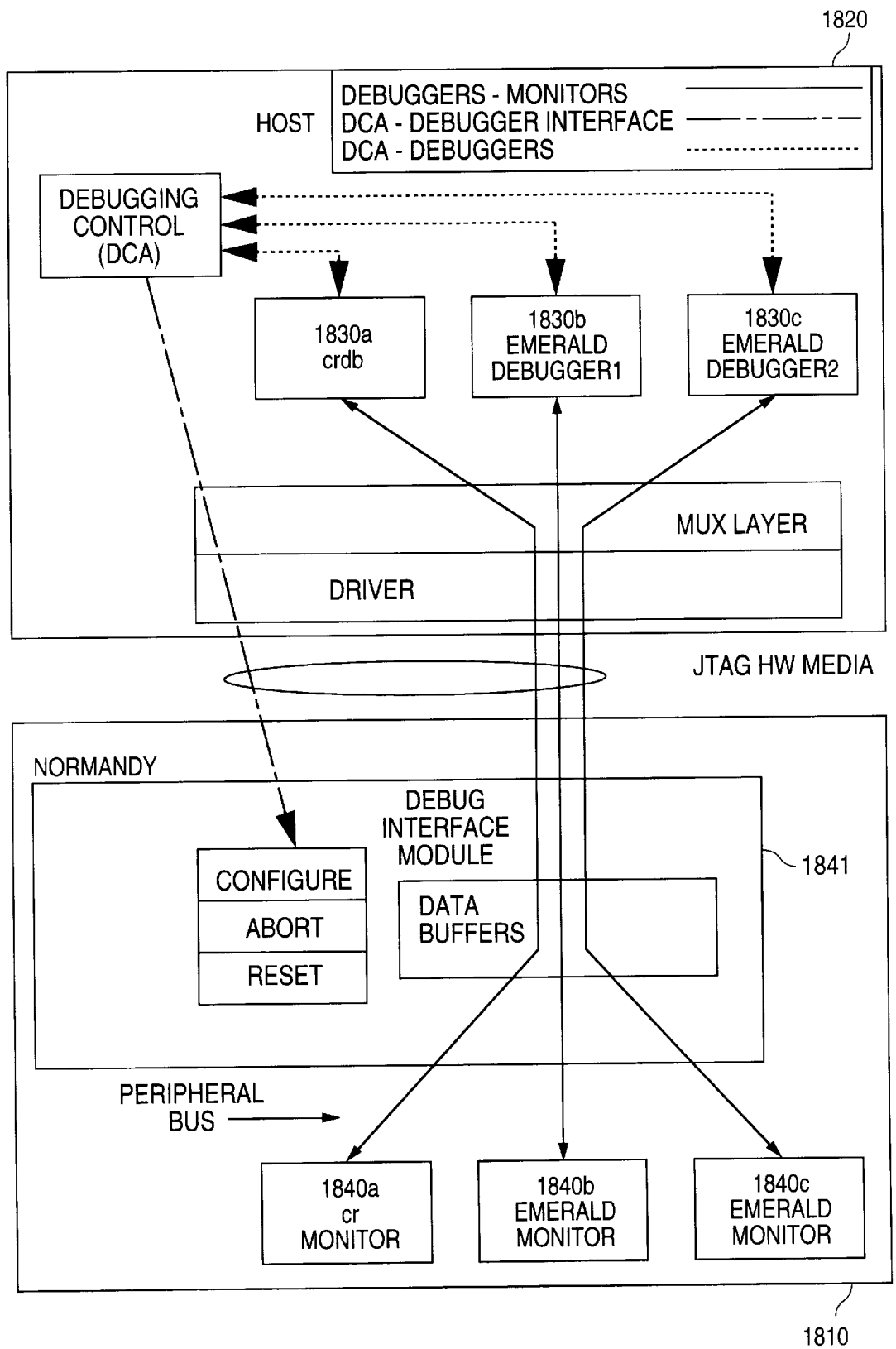
FIG. 19 shows data and command links between various components of the multiprocessor system shown in FIG. 18.
Figure 21:
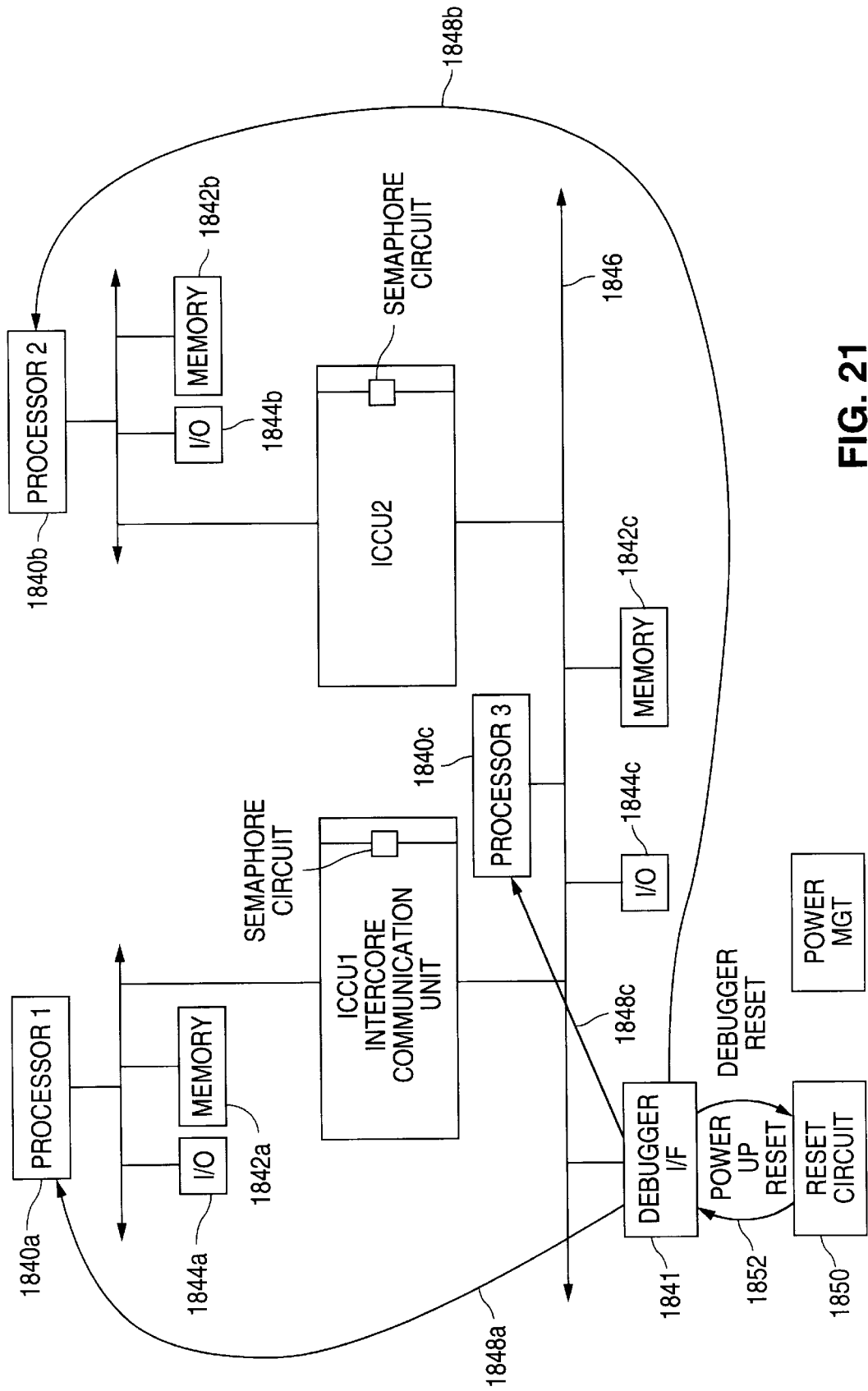
FIG. 21 illustrates in more detail the components of the multiprocessor system shown in FIGS. 18 and 19.

FIG. 18 illustrates the overall architecture of a system 1800 including a multiprocessor integrated circuit (Normandy 1810) and a host computer (HOST 1820) having a debugger (1830a to 1830c) for each processor (1840a to 1840c) that interacts in a debugger interface module 1841, with a separate monitor executing on each separate processor. After the phase of debugging software for the processors 1840a to 1840c of the multiprocessor integrated circuit 1850, the multiprocessor integrated circuit 1860 would, in most cases, no longer interact with the host computer 1820. FIG. 19 shows the data and command links between the various components (1830a to 1840c) of the debugger software executing on the host computer 1820 and the monitor software executing on the processors (1840a to 1840c) of the multiprocessor integrated circuit 1810. FIG. 21 shows how each processor core (i.e., Processor 1 1840a, Processor 2 1840b and Processor 3 1840c) has local memory (1842a and 1842c) and I/O devices (1844a to 1844c) on a local bus 1846. The debugger interface module 1841 has an interrupt connection (1848a through 1848c) to each of the processor cores (1840a to 1840c). A reset circuit 1850 provides a power up reset signal 1852 to the debugger interface module 1841. The debugger interface module 1841 provides a debugger reset request signal to the reset circuit, which in response provides a reset signal to the entire chip, including the debugger interface module 1841. An ICCU 1 (Intercore Communication Unit) is provided as an interface to the remainder of the system from the Processor 1, and an ICCU 2 is provided as an interface to the remainder of the system from the Processor 2. The interface includes circuitry to access memory and peripherals that reside on local busses of other processors. Each of ICCUI and ICCU2 includes a semaphore circuit that allows the processor cores to share resources or do signalling to each other. See application no. 08/813,501, filed Mar. 7, 1997 entitled Interface Controller Including Hardware Mechanism to Handle PS/2 Interface and hereby incorporated by reference in its entirety. The debugger interface module 1841 is now described in detail.

In accordance with an embodiment of the invention, the debugger interface module 1841 associates a processor number with each one of the processors in the multi-processor chip. This number is used as identification of messages and for other activities related to the processor number. The processor numbers in the described three-processor chip embodiment are: 0, 1 and 2.

Figure 1:
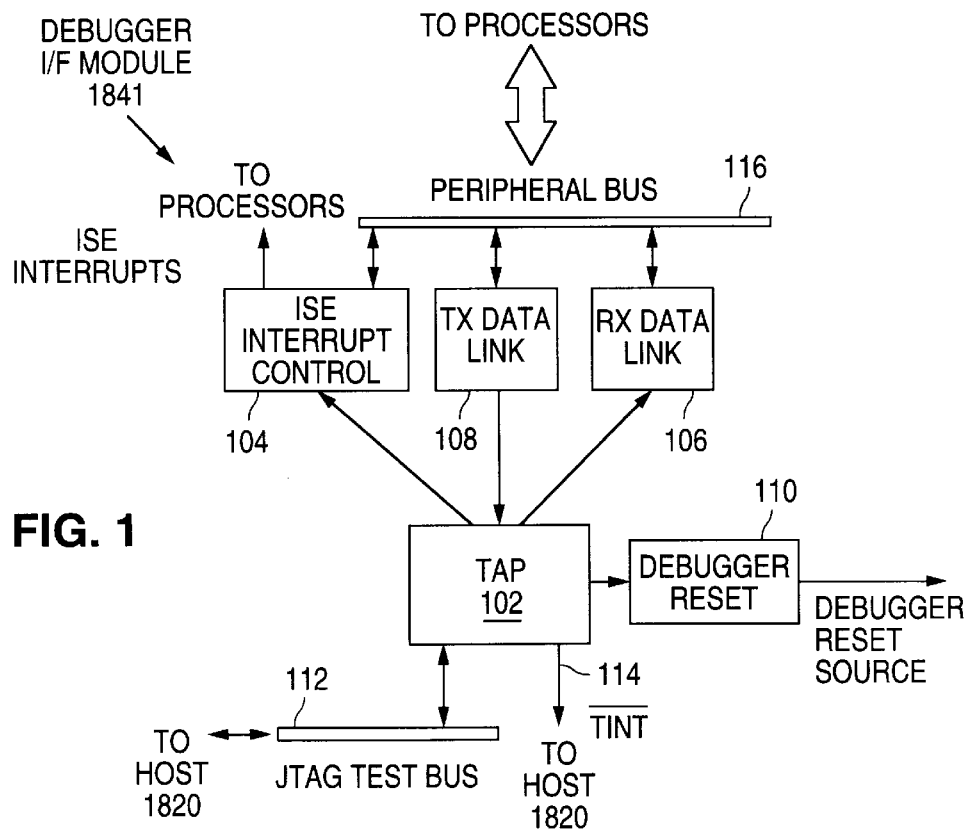
FIG. 1 is a block diagram of a debugger interface module in accordance with an embodiment of the invention.

A debugger interface module 1841 in accordance with an embodiment of the invention is shown in FIG. 1. The debugger interface module 1841 includes a Test Access Port (TAP) 102, ISE interrupt control module 104, RX 106 and TX 108 data links and a reset-by-command source circuit 110.

The TAP block 102 has an IEEE 1149.1a- 1990 standard interface to a JTAG test serial bus 112. (IEEE 1149.1 a- 1990 is a standard for boundary-scan architecture developed by the joint Test Action Group (JTAG). For a complete description of the standard see IEEE 1149.1a dated May 1990.) In addition, the TAP block 102 uses a TINT interrupt signal 114 to notify the host 1820 that a message upstream is waiting (described in more detail later). The TAP 102, together with the JTAG test bus 112, form the debugging communication channel and port for the multi-processor system 1810.

The TAP sends downstream messages (from the host 1820 to one of the on-chip processors 1840*a* to 1840*c*) to the RX data link 106, to be read by the relevant one of the processors 1840*a* to 1840*c* via a peripheral bus 116. The TAP circuit 102 was originally designed for supporting test equipment, and it was enhanced here (as allowed by the IEEE standard) for use as a communication channel and control. The TAP circuit 102 is based on a state machine (FIG. 3) that provides for serial input of JTAG formatted instructions and data and provides for output of status data.

The debugger interface module 1841 uses a special interpretation of these JTAG formatted instructions to embody the debugging features. One of the processors 1840*a* to 1840*c* writes upstream to the TX data link 108 for upstream transmission via the JTAG bus 112 to the host 1820. The ISE interrupt control block 104 generates a non-maskable interrupt to one of the processors 1840*a* to 1840*c* in cases of ABORT, or if there is a waiting message in the RX data link events.

The debugger reset circuit 110 generates a system reset in response to a debugger command. This is in addition to other reset sources, such as the power-up and hardware reset sources. Any one of the reset sources may trigger a system reset.

The interface signals from the debugger interface module 1841 to the host 1820 are as described below in Table 1. These signals are the JTAG standard signals (TD1, TD0, TCK, TMS and, optionally, TRST) and an additional output signal TINT.

TABLE 1

The Debugger Interface External Interface Signals

| Symbol | I/O | Function |
| --- | --- | --- |
| Reset out | O | Debugger Reset Source |
| ISE signals | O | Interrupt signals to cores |
| Bus I/F | I/O | Details are implementation dependent. Corresponds to peripheral bus in FIG. 1. Needs these signals to allow read/write operations. |
| TDI | I | Test Data Input. Serial test instruction and data are received by the debugger interface module at TDI. |
| TDO | O/Z | Test Data Output. TDO is the serial output for test instruction and data from the debugger interface module. |
| TCK | I | Test Clock. TCK provides the test clock for the test bus and logic. |
| TMS | I | Test Mode Select. The signal received at TMS is decoded by the Test Access Port (TAP) controller to control the module operation. |
| TINT | O | Test Interrupt. The debugger interface notifies the host about a valid message waiting to be sent, but a negative pulse on TINT. |
| TRST | Z | Power up reset. May be generated on chip or, alternately, may be supplied via an input pin. |

The debugger interface module 1841 supports four operations: RX session, TX session, chip RESET, and ABORT. Some of these operations can be simultaneously active for the same, or different, processors 1840*a* to 1840*c*.

Sending a message downstream, from the host 1820, is called an RX session. A message may be sent to a processor 1840*a* to 1840*c* associated with a particular debugger (one of 1830*a* to 1830*c*), via the test bus 112, TAP 102, and the RX data link 106. The RX buffer has a busy bit (FIG. 9, bit 0) that the host can read using an instruction scan/status scan to identify when the RX buffers are empty. Once this bit has read to be "0", indicating not busy.

One of the internal ISE interrupts is asserted (if not active) by ISE interrupt control 104, according to a PID (Processor Identification) field of the current instruction loaded into a TAP 102 IR register. The processor signaled by the ISE interrupt stops the execution of the application program and starts to execute the monitor. The monitor program then accesses the RX data link 106 via the peripheral bus 116 by reading the message length (optional), and then the message from an RX data buffer of the RX data link 106. At the end of the data transfer (RX session), the addressed processor turns off the "busy" indication of the RX data link 106.

Sending a message upstream, by one of the processors 1840*a* to 1840*c,* is called a TX session. In a TX session, one of the processors 1840*a* to 1840*c* attempts to "own" the TX data link 108 by accessing a TX semaphore DBGTXLOC register of the TX data link 108. If successful, the processor writes a message body to a TX data buffer, and a message length, in words, to a DBGTXST register of the TX data link 108.

After completion of data buffer update of the TX data link 108, the sending processor writes to one DBGTINT.ASSERT. This causes the TINT signal to be asserted indicating to the driver on the host (in FIG. 19) that there is a message waiting. The driver then scans the instruction/status register and it clocks for a processor ID other than $1111_b$, and a message length. It then scans the TAP with a scan TX instruction and performs a data scan with length as was indicated in the length field read together with the processor ID. The data received is passed to the debugger associated with that processor ID (1830*a* to 1830*c*).

The components of the system 1800 are reset by a dedicated TAP 102 instruction from the host processor 1820 via the JTAG test bus 112.

Abort is used to stop a processor's execution flow in response to an event caused by the host 1820 (e.g., a user pressed an abort button) or another processor reached a breakpoint and a full system stop is desired to best observe the entire system status at the time of the breakpoint.

To support this, either a TAP 102 instruction issued by the host or a bitset operation in the DBGABORT register issued by one or the other processors need to be executed. In response, processor 1840*a* to 1840*c* receive an unmaskable interrupt from ISE interrupt control 104 to stop its execution. Either of these causes the processor to assert a non-zero DBGISESRC.ABORT_I bit to indicate that an ABORT event occurred, which causes the ABORT.

The ABORT may be triggered for a processor for which a corresponding abort mask bit in the ABORT mask register of the TAP 102 is set. Then, either a "SCAN TX", with PID=Il 12, or a write of 1 to the respective bit in the DBGABORT register will cause the abort.

The RX Data link 106 includes an 8-word deep read/write data buffer, registers DBGRXD0 to DBGRXD7; and the status register, DBGRXST. On Normandy 1810 reset, the status register is set to its reset value. On TAP reset 102, the RX data link 106 maintains the values in the buffer.

When the TAP controller 102 is in Update-DR state and the current TAP 102 IR is SCAN_RX, the DBGRXDX registers are updated from the TAP data shift-register, DBG-DATA. Data is valid to the reading processor only while DBGRXST.BUSY is set. In this case (i.e., Update-DR of SCAN_RX), the TAP controller 102 copies the PID and length fields from the TAP 102 IR to the receive status register and sets DBGRXST.BUSY to 1 in this state.

A processor may turn off the DBGRXST.BUSY bit by writing 1 to this bit. DBGRXST.BUSY can be cleared, even when TCK is not toggling. The RX data link malfunctions regardless of the clock mode of the CPU cores (as controlled by a power management scheme). DBGDATA length is set to the length field of the SCAN_RX instruction before the Capture_DR state (discussed later). No parallel load is executed in the Capture-DR state.

The TX Data link 108 includes an 8-word deep, read/write data buffer, registers DBGTXD0 to DBGTXD7; a read/write status register, DBGTXST; a read/write semaphore lock register, DBGTXLOC; and a write-only TINT control register, DBGTINT.

Upon power up reset of the system, the TX data link 108 is reset. During any pending message, DBGTXLOC and DBGTXST are set to their reset values and TINT is released (1). Upon warm and internal reset, any partial message (i.e., TINT =1) is negated by setting DBGTXLOC and DBGTXST to their reset values. Messages that were completed by the processor (i.e., TINT=0) are maintained for transmission to the host, by maintaining DBGTXLOC and DBGTXST value.

On TAP 102 reset, data already within the TX data link 108 is maintained.

DBGTXD registers are captured by the TAP data shift-register, DBGDATA, during the Capture-DR state of the TAP controller, when the current IR is SCAN_TX. The DBGDATA length is set according to the length field of the DBGTXST register before the Capture_DR state of the SCAN_TX operation (discussed later). The TAP controller 102 IR register captures the values of the PID and MSG_LEN fields of DBGTXST status register when the TAP controller is in the Capture-IR state. No parallel load is executed in the Update-DR state. A processor 1840*a* to 1840*c* can access the TX Data-link registers in Active mode only.

To allocate the use of the TX data link 108 to one of the processors 1840*a* to 1840*c*, a semaphore is implemented by the DBGTXLOC register. A write operation of a value, which is not $1111_2$, to the PID field of the DBGTXLOC register changes the content of this field, but only when the PID fields equals to $1111_2$ (i.e., PID≠$1111_2$ indicates that the TX data link is busy and belongs to the processor having the PID value. This field returns to $1111_2$ in one of the following ways:

Write operation of $1111_2$ to the PID field of the DBGTX-LOC register from the peripheral bus while TINT is not asserted.

Update-DR state of the TAP controller, when the current instruction loaded into the TAP IR register is SCAN_TX (this action take place at rising edge of TCK).

Upon warm or internal reset if TINT=1, and upon power up reset.

For a processor to gain ownership of the TX data link 108, the processor captures the DBGTXLOC semaphore using the following sequence:

Verify that the DBGTXLOC.PID value is $1111_2$. If it is not and the value is another PID wait for $1111_2$. If it is the processor PID, wait for a period that will allow the host to read the data in case TINT is active. If PID is still read after that pause, store the contents of the DBGTD0-D7 and DBGTXST registers and start sending the message. After the message is received by the host (PID is $1111_2$) restore the DBGTOX and DBGTXST to their original values.

Write the processor PID code to the DBGTXLOC register.

Read DBGTXLOC. If the PID field is equal to the value that was written, the TX data link 108 has been granted. If not, the last two steps of the capture process should be repeated.

A processor 1840*a* to 1840*c* should access the TX data link 108 registers (DBGTXDi) and the DBGTXST register only after successfully gaining ownership over the TX data link 108 (i.e., using the semaphore sequence just described).

The TINT signal is an active-low pulse asserted by the TX data link 108 at the write operation of 1 to DBGTINT.ASSERT, and released, together with the semaphore indication, in the Update-DR state of the TAP controller, when the current instruction loaded into the TAP IR register is SCAN_TX.

The DBGTXLOC, DBGTXST and DBGTXDi registers should be accessed only while TINT is not asserted. TINT being released can be identified by the DBGTXLOC.PID being released ($1111_2$).

It should be noted that the option to write $1111_2$ to the PID for semaphore release is an escape path for dead-locks, and is not required for normal operation.

The debugger reset circuit is now described. For debugging purposes three reset events may occur:

Power-up: This may be triggered by either an on-chip power up reset circuit or by an input signal (TRST) as shown in FIG. 19A. This reset occurs only when the system is powered up and resets all parts of the system, including the TAP controller 102. If no on-chip power-on-reset is available, TRST may be connected off-chip.

WARM reset: This is any reset event that reset the processors 1840*a* and 1840*c* and associated logic, and which does not follow power up. This reset will not reset the TAP controller 102 or activities related to it. This is required to meet the JTAG standard.

Debugger Initiated reset: This is an output from the debugger interface module 1841. It is initiated by the debugger. It has effects of warm reset on the Normandy chip 1810.

A debugger-initiated reset request is asserted in the Update-DR state of the TAP controller 102, when the current instruction is ASSERT_DBG_RST. This triggers a debugger reset as described in detail later. The reset request may be sent while the chip is in Active, Power Save or Halt modes. It is functional even if TCK is not toggling, one cycle after exit from the Update-DR controller state.

Figure 20:
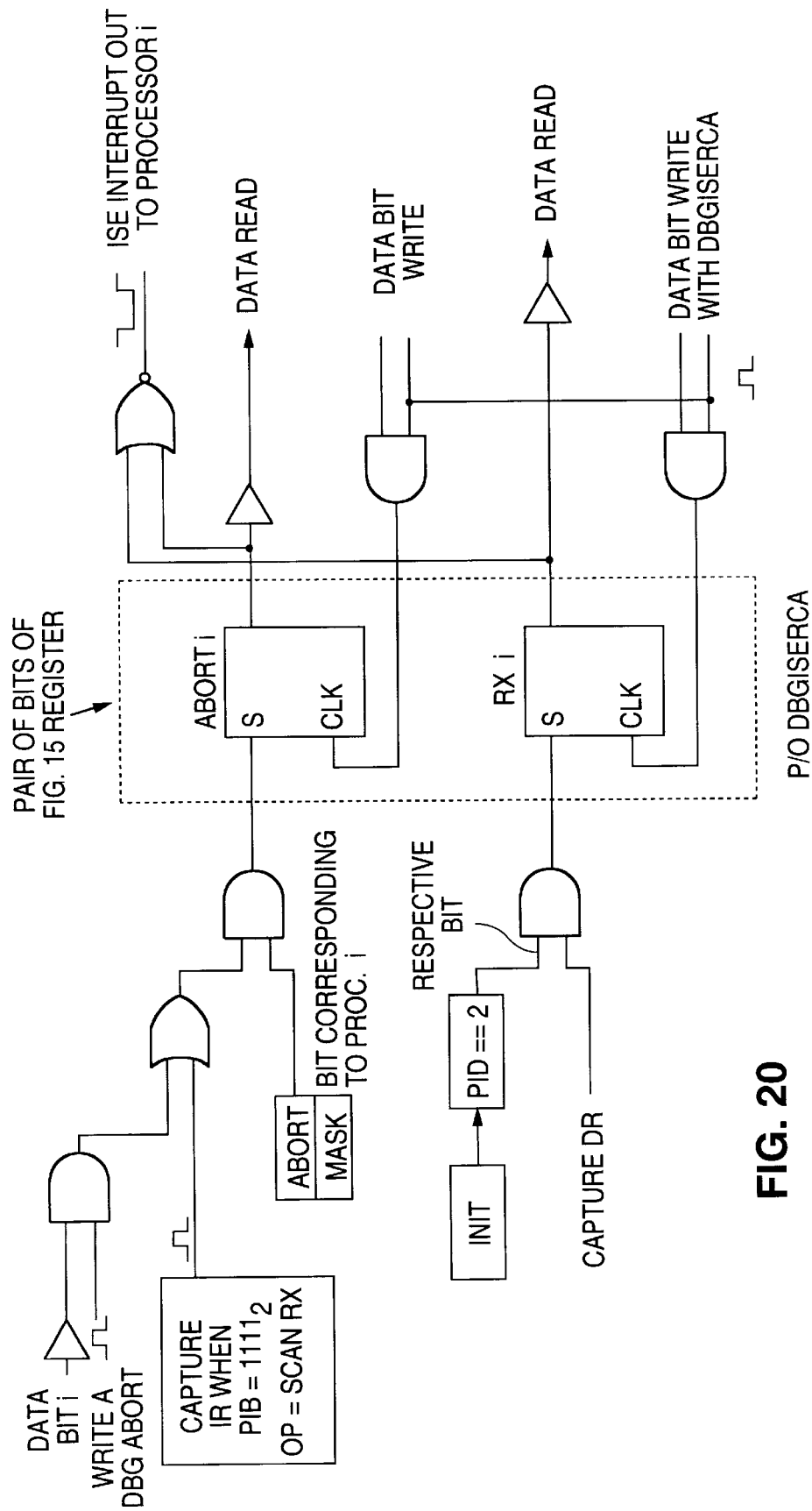
FIG. 20 shows a circuit for generating the ISE interrupt control by the ISE interrupt block of FIG. 1.

A circuit for generating the ISE interrupt control, including the registers involved, is shown in FIG. 20. The ISE interrupt block 104 sends ISE interrupt requests to the processor cores 1840a to 1840c. It includes the write-only DBGABORT register, the DBGMASKS JTAG serial shift register, and the read/write DBGISESRC register.

The DBGISESRC register is cleared upon system reset. During TAP 102 reset, the values of the ISE block registers are maintained. DBGMASKS value is modified only in the Update-DR state of the TAP controller, while the current instruction is SCAN_ABORT_MASK.

The interrupt control module issues an ISE interrupt request to either a specific one of the processors 1840a to 1840c, or to multiple processors, together with the matched DBGISESRC bit, according to the MESSAGE or ABORT event.

In a MESSAGE event, an ISE interrupt is requested for a specific processor or processors 1840a to 1840c according to the PID field of the SCAN_RX instruction. The request is issued (together with DBGISESRC bit assertion) if the current instruction loaded in TAP IR is SCAN_RX, and the TAP controller 102 is in the Update-DR state (Rising Edge of TCK).

An ABORT event occurs when SCAN_RX is executed with a PID of all 1's (ISE and DBGISESRC.ABORT_bits are asserted), or when a processor's bits P_i are set in the DBGABORT register by one of the processors (i.e., ISE and DBGISESRC bits are asserted with the write operation itself). If DBGABORT is written with some zero bits, the PIDs that correspond to these zero bits do not get the ISE interrupt). In an ABORT event, the assertion of each ISE interrupt and DBGISESRC bit depends on the masking bit, corresponding to that ISE interrupt, at the DBGMASKS shift register.

Each ISE interrupt is cleared when DBGISESRC.ABORT_i and IDBGISESRC.RX_i both equal 0. Any bit in the DBGISESRC register is cleared by writing 1 to its corresponding location in the register (i.e., writing a 0 is "don't-care," but writing 1 clears the bit). If there is a new source activity, together (in the same write cycle) with clearing the DBGISESRC register bits of a specific processor, the ISE interrupt control asserts ISE again, together with the source bit.

The ISE interrupt signal is an active-high pulse. If a particular processor core requires an active-low pulse, then an inverter should be provided. For nested ISE sources, the ISE remains asserted, and the ISE control block sets the new source bit to 1. This is used to prevent nesting of interrupts on the core. Note that this assumes an edge triggered non-maskable interrupt in the core. Other kinds of interrupts may need additional (or different) handling.

DBGMASKS is not available to the peripheral bus 1I16. Rather, it is accessible only from the JTAG test bus 112, when the SCAN_ABORT_MASK instruction is loaded into the TAP IR.

The ISE signal, together with its source bit, are asserted regardless of the cores' clock modes. If a processor core 1840 to 1840c supports a sleep mode, for wake-up purposes, when the source is a debugger message or debugger abort, ISE should be able to wake up that processor core from the sleep mode. Functionality should be consistent while changing modes (i.e., during wake-up). Full functionality of the ISE interrupt control block 104 is maintained even when TCK is not toggling.

Some operations are related to TCK; some operations are related to the system's main clock; and some operations are asynchronous. The system's logic needs to guarantee correct operation, and meta-stable protected interface, in all its operating modes, Active (core running at full clock speed), Power Save (core running at slow clock speed and reduced functionality) and Halt (core clock stopped). The processors may access the debugger interface module 1841 registers only with clocks.

The Test Access Port (TAP) 102 is now described. The Test Access Port (TAP) 102 is based on the IEEE 1149.1 a-1993 standard. For the sake of completeness of this description, each of the listed documents are hereby incorporated by reference in their entirety.

For a more detailed description, and examples of the standard, see IEEE Standard Test Access Port and Boundary-Scan Architecture, May 21, 1990.

For further details of test-bus chips and equipment, see manufacturers data sheets and application notes, e.g., SCANTM Databook, National Semiconductor 400102.

For technical background, refer to textbooks on the subject, for example, Colin M. Maunder and Rodham E. Tulloss, "The Test Access Port and Boundary-Scan Architecture", IEEE Computer Society Press Tutorial.

As noted above, the TAP 102 for the system 1800 is a communication element. One implementation does not support the IEEE 1149.1a testing facilities, but it may be enhanced to do so. In this embodiment, the TAP 102 communication element is used here to benefit from off-the-shelf bus controller cards and software, and potential enhancements to the test scheme in the future.

The TAP 102 interfaces to the JTAG test bus 112 via interface signals TCK (test clock), TMS (test mode select), TDI (test data input) and TDO (test data output). The TAP controller 202 is reset at power-up reset only. The interface signals are now described with reference to FIG. 2.

The TAP TRST is connected in one implementation to the chip's power-up reset. It is implemented asynchronously in a way that will allow TRST usage as an off-chip signal in the future, without any change in this module.

TCK provides the clock for the test bus 112 and TAP controller 102. Stored-state devices in the TAP 102 maintain their state indefinitely after the signal applied to TCK is stopped.

The TAP controller 202 "next state" is set by the TMS value and the current state of the TAP controller 202. The TAP samples the signal presented at TMS on the rising edge of TCK. Circuitry, fed from TMS, produces the same response to the application of a logic 1 as for a non-driven input.

The data and instructions are serially input to the TAP 102 via TDI. The TAP 102 samples the signal presented at TDI on the rising edge of TCK. Circuitry, fed from TDI, produces the same response to the application of a logic 1 as for a non-driven input.

When data is shifted from TDI towards TDO, test data received at TDI appears without inversion at TDO, following a number of rising and falling edges of TCK. The number of edges is determined by the length of the instruction or test data register selected.

The data and instructions are serially output to TDO. The signal driven through TDO only changes state following the falling edge of TCK. The TDO driver 208 is set to an inactive drive state except while data or an instruction is being scanned.

Now the top-level design of the TAP 102 is described. Then, the detailed design of the component blocks of the TAP 102 are described. It should be noted that the TAP block 102, in this document, corresponds generally to "Test Logic" in the IEEE JTAG Standard. The term "Test Logic" is totally out of context in a communication element, which is the real function of this block in the embodiment herein described.

Figure 2:
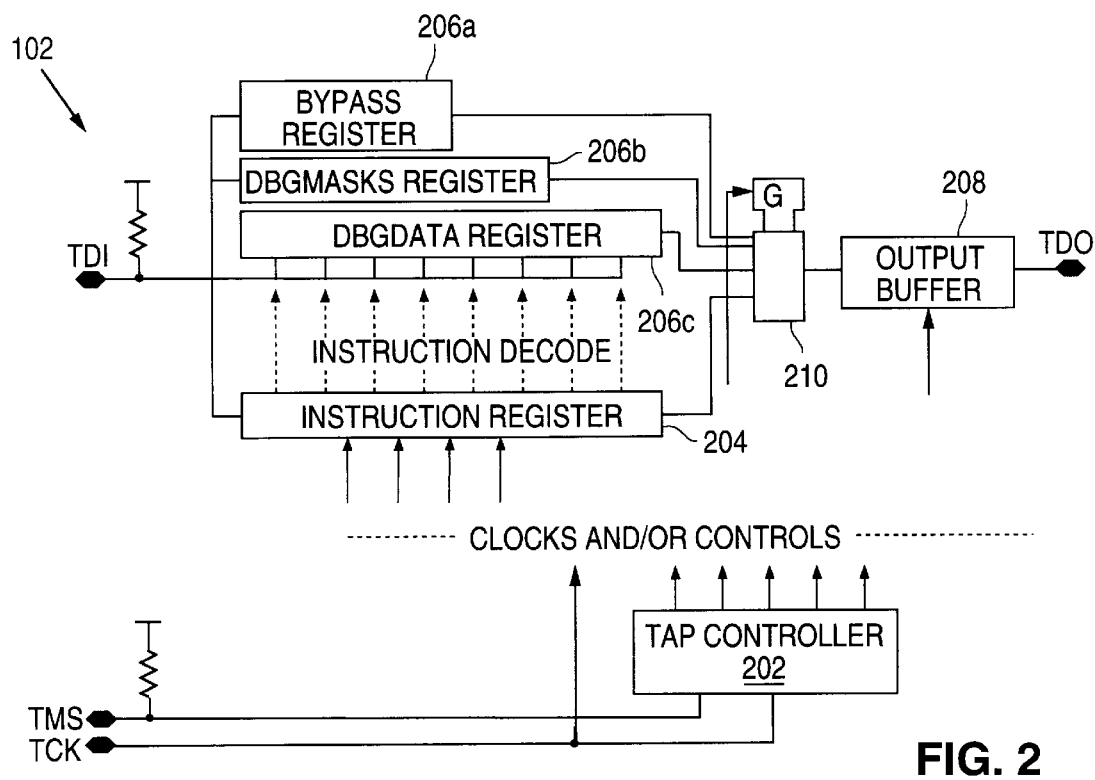
FIG. 2 is a block diagram of the test access port (TAP) of the debugger interface module of FIG. 1.

The particular blocks of the TAP 102 are now discussed with reference to FIG. 2. The TAP 102 includes the following elements.

1. A TAP signal interface (already described).
2. The TAP controller 202.
3. An instruction register 204.
4. A group of data registers 206a to 206c.

The instruction register 204 and data registers 206a to 206c have separate shift-register-based paths, connected in parallel. These registers have a common serial-data input TDI, and a common serial-data output TDO. The TAP controller 202 selects, using TDI and TDO, the alternative instruction register 204 and data register 206a to 206c parallel paths.

The TAP controller 202 is a synchronous finite state machine that operates responsive to changes in the TMS and TCK signals to control the sequence of operations of the Normandy reset, ISE interrupt control and data links circuitry.

Figure 3:
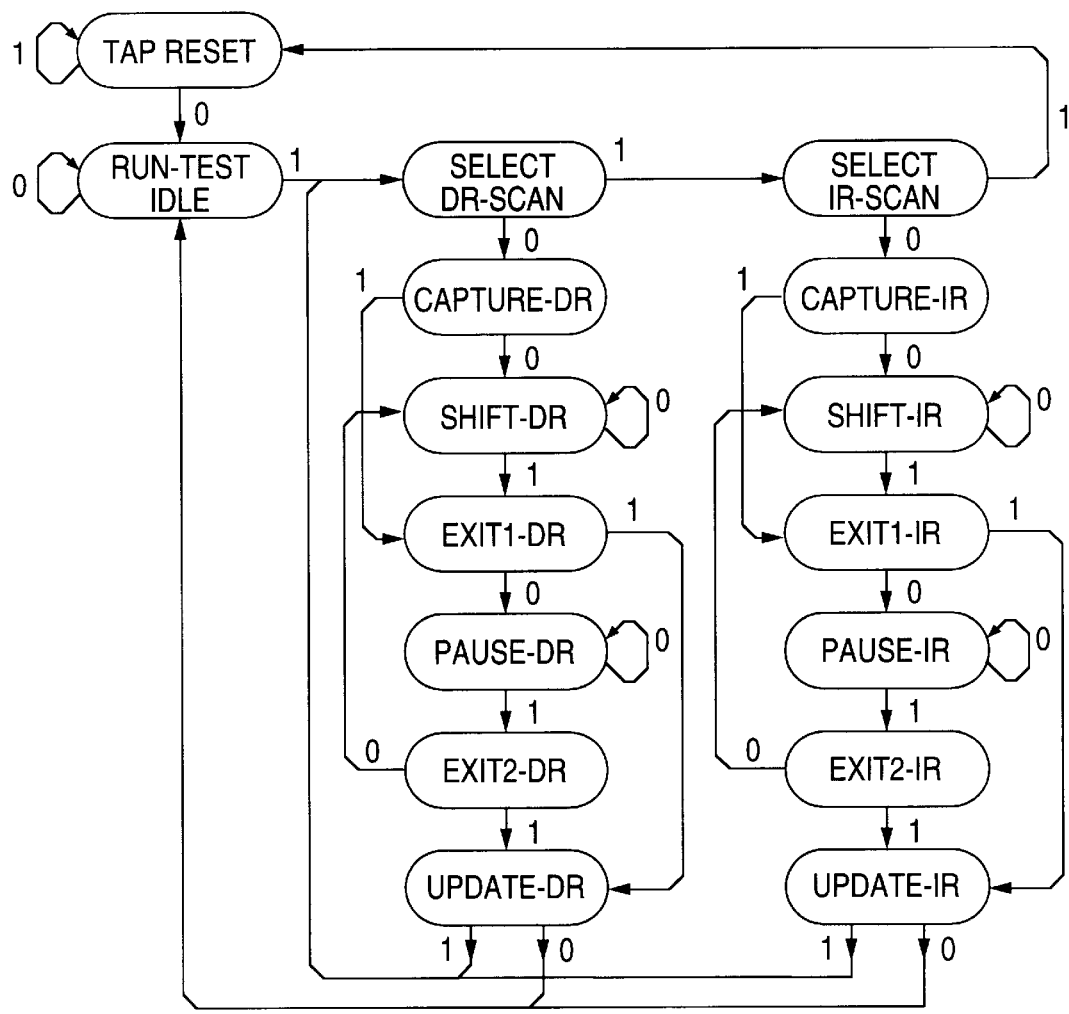
FIG. 3 is a state machine that illustrates the operation of the TAP controller of FIG. 2.

FIG. 3 is a TAP controller 202 state diagram. For a detailed description of the TAP controller 202 states, see IEEE Specification 1149.1a-1993, which is hereby incorporated by reference in its entirety.

Figure 4:
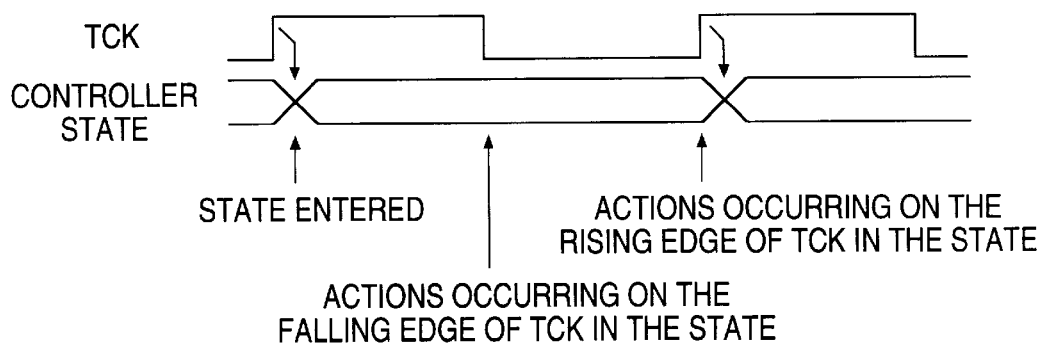
FIG. 4 is a timing diagram that illustrates how the controller state as shown in the state machine of FIG. 3 changes relative to a clock signal.

All state transitions of the TAP controller 202 occur according to the value of TMS on a rising edge of TCK. Actions of the TAP 102 (instruction register 204 and data registers 206a to 206c.) occur either on the rising, or falling, edge of TCK in each controller state, as shown in the FIG. 4 timing diagram.

Specifically the TAP controller 202 changes state in response to the following events:
A rising edge of TCK
Power up or TRST.

The TAP controller 202 generates signals to control the operation of the TAP registers 204 and 206a to 206c, and associated Normandy reset, ISE interrupt control and data links circuitry.

The TDO output buffer 208, and the circuitry 210 that selects which register output 5 supplied to TDO, are controlled as shown in Table 2. Changes at TDO, as shown in Table 2, occur on the falling edge of TCK following entry into the state.

TABLE 2

TAP 102 Operation in Each Controller State

| Controller 202 State | Register Selected to Drive TDO | TDO Driver |
|---|---|---|
| TAP Reset | Undefined | Inactive |
| Run-Test Idle | Undefined | Inactive |
| Select-DR-Scan | Undefined | Inactive |

TABLE 2-continued

TAP 102 Operation in Each Controller State

| Controller 202 State | Register Selected to Drive TDO | TDO Driver |
|---|---|---|
| Select-IR-Scan | Undefined | Inactive |
| Capture-IR | Undefined | Inactive |
| Shift-IR | Instruction | Active |
| Exit1-IR | Undefined | Inactive |
| Pause-IR | Undefined | Inactive |
| Exit2-IR | Undefined | Inactive |
| Update-IR | Undefined | Inactive |
| Capture-DR | Undefined | Inactive |
| Shift-DR | Test Data | Active |
| Exit1-DR | Undefined | Inactive |
| Pause-DR | Undefined | Inactive |
| Exit2-DR | Undefined | Inactive |
| Update-DR | Undefined | Inactive |

Circuitry built into the system forces the TAP controller 202 into the TAP-Reset controller state at power up (or TST input being active) in an asynchronous manner. The TAP controller 202 should not be initialized by operation of any system input, such as a system reset. Five consecutive TCK cycles with TMS equal to 1 brings the controller to the TAP-reset state from any state.

The instruction register 204 is utilized to shift an instruction into the debugger interface module 1841. The instruction is used to select the mode of operation, the data register to be addressed, or both.

In any serial scan operation the TAP 102 transmits and receives vectors of the same length (which is a property required by the JTAG standard). This property of a serial scan chain is utilized for transmitting status bits from the device to the bus controller in any instruction-scan operation. The instruction register 204 allows examination of status information generated within the data-links according to Table 3.

The instruction register 204 is a shift-register-based design, with a parallel input for register cells other than the two nearest to the serial output. An instruction, shifted into the register, is latched at the completion of the shifting process.

The instruction register 204 includes 12 shift-register-based cells to hold instruction data. An instruction, shifted into the instruction register 204, is latched such that the changes in the effect of an instruction occur only in the Update-IR and TAP-Reset controller 202 states. There is no inversion of data between the serial input and the serial output of the instruction register.

The instruction register parallel inputs, to be loaded at Capture-IR controller state, of any instruction-scan operation, are shown in Table 3.

TABLE 3

Instruction register status bits

| D11 | D7 | D6 | D3 | D2 | D1 | D0 |
|---|---|---|---|---|---|---|
| MSG_LEN | | PID | | RX_busy | 0 | 1 |

D0
    Fixed value required by standard.
D1
    Fixed value required by standard.
RX_BUSY
    Receive Busy. Busy indication from the RX data link.
PID
    Processor ID. Contains the processor ID from the TX data link. When TINT is non-active (1) the PID field is 1 1 1 1 1 $1_2$, indicating TABLE 3-continued Instruction register status bits that the TX link has no valid data. When TINT is active (0), the PID field indicates the value of the DBGTXLOC.PID field. Note that this value is latched when TINT becomes active and is held until the RX data is read by the host 1820.
MSG_LEN
      Message Length. Contains the TX message length in words. When the TX status word PID field is other than 1 1 1 1$_2$, the MSG_LEN holds a copy of the DBGTXST.MSG_LEN field. When the size of DBGTXST.MSG_LEN is less than five bits, the MSBs of MSG_LEN in the status word are forced to 0's.

Table 4 shows the behavior of the instruction register 204 in each TAP controller 202 state.

TABLE 4

Instruction Register 204 Operation in Each TAP Controller 202 State

| Controller State | Shift-Register Stage | Parallel Output |
|---|---|---|
| TAP Reset | Undefined | Set to give BYPASS instruction |
| Capture-IR | Load status data (Table 3) | Retain last state |
| Shift-IR | Shift towards serial output | Retain last state |
| Exit1-IR | Retain last state | Retain last state |
| Exit2-IR | | |
| Pause-IR | | |
| Update-IR | Retain last state | Load from shift-register stage |
| All other states | Undefined | Retain last state |

All actions resulting from an instruction terminate when a new instruction is transferred to the parallel output of the instruction register 204 (i.e., in the Update-IR or TAP-Reset controller states).

All operations of the shift-register stages occur on the rising edge of TCK, after entry into a controller state. The data present at the parallel output of the instruction register 204 is latched from the shift-register stage on the falling edge of TCK in the Update-IR controller state. After entry into the TAP-Reset controller state, as a result of the clocked operation of the TAP controller 202, the BYPASS instruction is latched onto the instruction register 204 output on the falling edge of TCK.

Instructions are serially entered into the debugger interface module 1841, during an instruction-register scan, via the instruction register 204. Data registers not selected by the current instruction do not interfere with the operation of the on-chip system logic or the selected data registers. Each instruction enables a single serial-data register path to shift data between TDI and TDO in the Shift-DR controller state, as shown in Table 5. Instruction codes that are not required to control test logic are equivalent to a BYPASS instruction.

In particular, the BYPASS instruction operates the Debug BYPASS register 206a. The BYPASS register 206a contains a single shift-register stage, and provides a minimum-length serial path between the TDI and TDO pins of a component when no test operation is needed for that component. This allows more rapid movement of test data to and from other components on a board that are required to perform test operations. The BYPASS instruction selects the Debug Bypass register to be connected for serial access between TDI and TDO in the Shift_DR controller state. If the BYPASS instruction is selected, all the other data registers continue with their normal functionality.

The SCAN_TX instruction switches the data scan path to the DBGDATA shift register 206c. As a result of the Capture-DR state of the TAP controller, the DBGDATA shift register 206c captures the values from the TX data link 108 buffer DBGTXD. The length of the DBGDATA serial shift register is set to DBGTXST.MSG_LEN. No parallel load is performed in the Update-DR state. Upon Update-DR state, the controller sets DBGTXLOC to all 1's and releases TINT. This operation clears the semaphore, and enables the data link for a new transaction. TINT is asserted as previously described.

The SCAN_RX instruction switches the data-scan path to the DBGDATA shift register 206c. The DBGDATA length is set to L0–L4. The result of the Capture-DR state of the TAP controller 202 is unpredictable. A parallel load of data from the shift-register DBGDATA 206c to the RX link 106 data buffer DBGRXD is done in the Update-DR state.

The TAP controller 202 sets the RX_BUSY indication of DBGRXST (of the RX link 106) to 1 in the Update-DR state. The PID and message fields of the SCAN_RX instruction are available for read access, through the peripheral bus 116, from the DBGRXST register of the RX link 106. The ISE interrupt control block 104 asserts the ISE interrupt and the DBGISESRC.RX_i bit (of the ISE interrupt control block 104), according to the PID index.

The Debugger Abort operation has no dedicated op-code. It is performed using the SCAN_RX instruction with the PID field being 1111$_2$. Following this mode of SCAN_RX, the ISE interrupt control block 104 asserts ISE interrupts, together with the DBGISESRC.ABORT_i bits, according to the MASKS values of DBGMASKS register 206b. The assertion is triggered in the TCK rising-edge during the Update-IR state. In this case, there is no RX_BUSY indication nor any change in the contents of DBGRXST register (i.e., this format of SCAN_RX may be issued with a busy RX data link).

The SCAN_ABORT_MASK instruction switches the data scan path to the DBGMASKS shift register 206b. The result is that during the Capture-DR state of the TAP controller 202, there is a parallel update of the DBGMASKS shift register 206b with the MASKS values. Parallel load is performed in the Update-DR state to update the MASKS values.

An Assert_Dbg_Rst instruction causes a debugger reset to be asserted in the Update-DR state of the TAP controller 202. Serial data is switched to the Debug Bypass register 206a.

The IR instruction binary codes are summarized in Table 5.

TABLE 5

The IR Instruction Binary Codes

| D11 | D10 | D9 | D8 | D7 | D6 | D5 | D4 | D3 | D2 | D1 | D0 | Instruction |
|---|---|---|---|---|---|---|---|---|---|---|---|---|
| X | X | X | X | X | X | X | X | X | 0 | 0 | 0 | BYPASS |
| X | X | X | X | X | X | X | X | X | 1 | 1 | 1 | BYPASS |

TABLE 5-continued

The IR Instruction Binary Codes

| D11 | D10 | D9 | D8 | D7 | D6 | D5 | D4 | D3 | D2 | D1 | D0 | Instruction |
|-----|-----|----|----|----|----|----|----|----|----|----|----|----|
| X | X | X | X | X | X | X | X | X | 1 | 1 | 0 | BYPASS |
| X | X | X | X | X | X | X | X | X | 0 | 0 | 1 | BYPASS |
| L4 | L3 | L2 | L1 | L0 | PID3 | PID2 | PID1 | PID0 | 0 | 1 | 0 | SCAN_RX |
| X | X | X | X | X | X | X | X | X | 0 | 1 | 1 | SCAN_TX |
| X | X | X | X | X | X | X | X | X | 1 | 0 | 1 | SCAN_ABORT_MASK |
| X | X | X | X | X | X | X | X | X | 1 | 0 | 0 | ASSERT_DBG_RST |

Notes
1. D0 is the nearest to the serial output.
2. X means "don't care".
3. Debugger abort is generated by SCAN_RX with PID = 11112.

The Debugger Interface Module 1841 Serial Shift Registers are now described. FIG. 5 shows the bit allocation for a parallel load operation between any pair of serial shift-registers and a peripheral-bus addressable register. When data is shifted through a data register of the TAP 102, data applied to TDI appears without inversion at TDO, following an appropriate number of TCK transitions, when the TAP controller 202 is in the Shift-DR state. The particular data register connected between TDI and TDO shifts data one stage towards TDO after each rising edge of TCK in the Shift-DR TAP controller 202 state. In the TAP-Reset controller state, all data registers either perform their system function (if one exists), or the data registers do not interfere with the operation of the on-chip system logic.

If, in response to a current instruction in the instruction register 204, a data register loads data from a parallel input, the data is loaded on the rising edge of TCK following entry into the Capture-DR TAP controller 202 mode. If the data register that is connected between TDI and TDO in response to the current instruction is provided with latched parallel data outputs, the data is latched into the parallel output buffers on the falling edge of TCK, during the Update-DR or Run-Test/idle controller states, as appropriate. If, in response to a current instruction, no operation of a selected data register is required in a given controller state, that selected data register retains its last state, unchanged. When the TAP controller 202 state machine is at state "TAP Reset," during power up reset, the instruction register 204 is reset.

Table 6 summarizes the data register operation in each TAP controller state.

TABLE 6

Data Register Operation in Each Controller State

| Controller State | Action |
|---|---|
| Capture-DR | Load data at parallel input into shift-register stage. Parallel output registers, or latch, retains last state. |
| Shift-DR | Shift data towards serial output. Parallel output register, or latch where provided, retains state. |
| Exit1-DR Exit2-DR Pause-DR | Retain last state. |
| Update-DR | Load parallel output register, or latch, from the shift-register stage. Shift-register stage retains state. |
| All other controller states | Register that have a parallel output maintain the last state of this output; otherwise undefined. |

The Debug Bypass register 206a provides a minimum-length serial path for the movement of data between TDI and TDO. This path can be selected when no other data register needs to be accessed. The Debug Bypass register 206a includes a single shift-register stage.

When the current instruction selects the Debug Bypass register 206a for inclusion in the serial path between TDI and TDO, the shift-register stage is set to 0 on the rising edge of TCK following entry into the Capture-DR TAP controller 202 state. The Debug Bypass register 206a is accessed from the test bus 112 only.

The DBGDATA register 206c is the shift-register element of DBGRXD (of the RX data link 106) and DBGTXD (of the TX data link 108). It is accessed from the test bus 112 only. FIG. 6 shows the parallel load data scheme.

The DBGDATA register 206c includes shift-register stages according to the data buffer's length. The actual length, in a scan operation, is set before Capture-DR state when the current instruction is SCAN_RX or SCAN_TX. In the first case (SCAN_RX), the length is set according to SCAN_RX L0 to L4. In the latter case (SCAN_TX), the length is set according to the DBGTXST.MSG_LEN field.

The actual length of the register is 16*(length+1) where length is the binary positive number created by the length field (with L4 as MSB). A calculated length longer than the maximum data buffer length is mapped to maximum length. A calculated length smaller than the maximum results in loading the data to/from the smallest addresses in the data buffer. Maximum length in one design is 128 shift register stages. It should be noted that TDO is always fixed, while the TDI "insertion-point" changes according to the actual length.

The Debug Abort Mask Register 206b (DBGMASKS) is now discussed. As shown in FIG. 7, a serial shift-register, with a parallel output and parallel input (for read and write of ABORT_MASK register), is accessible by the test bus 112 while the SCAN_ABORT_MASK instruction is set to the TAP IR. The DBGMASKS register 206b is not addressable from the peripheral bus 116. Non-reserved bits of the ABORT_MASK register 206b are preset to 1 upon power up reset.

The ABORT_MASK register includes shift-register stages with 16 bits. Bits 3 through 15 are reserved (bits 0 through 2 being useable for each respective processor 1840a to 1840c, respectively) and should be written 0. A bit value of 1 means that the abort is enabled for the respective processor 1840a to 1840c, a bit value of 0 disables the abort for the respective processor.

Now, the registers of the debugger interface module 1841, as they appear to the processor cores 1840a to 1840c, are discussed. The processor cores can perform read and/or write operations to the debuggers 1830a to 1830c using these registers. The registers should be accessible using memory and I/O operations.

As seen by the processors 1840a to 1840c, DBGRXD0 through DBGRXD7 are a bank of eight word-wide, read only registers of the RX data link 106 function. The DBGRXD registers are written from the JTAG test bus 112. From the peripheral bus 116, they can only be read. The DBGRXD register formats as shown in FIG. 8.

RX_data of the DBGRXD register is the receive data, i.e., data bits of the RX data link data buffer.

DBGRXST is a byte-wide, read/write register, updated by the TAP controller 102 to reflect the PID and MSG$_{13}$ LEN fields of the SCAN_RX instruction. Bits 1 through 7 of this register are read only bits. Data written to them is ignored. The DBGRXST register formats are shown in FIG. 9.

RX_BUSY of DBGRXST is a "receive busy" data link busy indication. This bit can be cleared by writing a one to it. Writing 0 to this bit is ignored.

0: Not Busy.
1: Busy.

PID of DBGRXST is a processor index. A write operation to this field is ignored.

0–2: Processor ID index
3–14: Invalid. 15: All processors abort.

MSG_LEN of DBGRXST indicates the message length of a receive data message. The message length equals (MSG_LEN+1). A write operation to this field is ignored.

DBGTXD are debug transmit data registers, a word-wide, read/write register bank. The DBGTXD registers are written by a processor 1840a to 1840c from the peripheral bus 116. The DBGTXD register formats are shown in FIG. 10.

DBGTXLOC is a debug transmit lock register, a byte-wide read/write register. The PID field of this register is used as a semaphore for locking the TX channel 108 for a specific processor 1840a to 1840c. Upon warm or internal reset this register is loaded with $F_{16}$, if TINT is not active (1). It is not affected by warm or internal reset if TINT is active. The register is always loaded with $F_{16}$ at power up reset (or TRST). The DBGTXLOC register format is shown in FIG. 11.

As just discussed, PID is the processor index, indicating which processor 1840a to 1840c currently has control over the TX channel 108. When TINT becomes active, the value of PID is locked. PID is reset back to $F_{16}$ after the host read the data, on Update_DR state of SCAN_TX instruction.

$0_{16}$–$E_{16}$: Processor ID index. When the PID field holds any of these values, write operations of values other then $F_{16}$ are ignored.

$F_{16}$: Semaphore free indication. When the PID field holds this value, write operations may capture the TX for the use of a processor.

DBGTXST is a debug transmit register, byte-wide, read/write register. This register is written by a processor 1840a to 1840c to indicate the message length (this information is used by the TX data link 108 to set the length of the serial shift register DBGDATA and by the processor software to define the message length parameter). While TINT is not active, this register may be written at anytime. While TINT is active, the content of this register is locked and can be read by the host 1820 via the TAP controller 102 status word MSG_LEN field. Also, while TINT is not active, DBGTXST is cleared upon reset. While TINT is active, only power-up reset clears DBGTXST. The DBGTXST register format is shown in FIG. 12.

MSG_LEN of DBGTXST indicates the message length of a transmit data message. The number of words in a message equals (MSG_LEN+1).

The Debug TINT Assert Register (DBGTINT) is a byte-wide, write-only, register used to assert TINT. The DBGTINT register format is shown in FIG. 13.

The ASSERT bit is used for TINT control. Writing 1 to this bit asserts the TINT output. TINT is deasserted during the UPDATE_DR state of TX_SCAN or during power up reset.

DBGABORT is the debug abort generate register, a word-wide, write-only register, used to generate an ABORT. A processor 1840a to 1840c may generate an ABORT to a processor with a PID index of i, by modifying its P_i bit to 1. Writing 0 to P_i does not result in ISE interrupt assertion to that processor 1840a to 1840c. The DBGABORT register format is shown in FIG. 14.

P_i of DBGABORT indicates the ABORT source activation.

0: Processor ID i does not get an ABORT.
1: Processor ID i gets an ABORT.

Res of DBGABORT indicates a reserved bit for future expansion.

DBGISESRCA is the debug ISE source registers A, a word-wide, read/write register which indicates the ISE sources. Writing 1 to a bit in this register clears it. Writing 0 to a bit does not change its value. The DBGISESRCA register format is shown in FIG. 15.

RX_i of DBGISESRCA is the ISE source of the RX data link 106, turned on with ISE assertion and turned off by writing a byte to DBGISESRC containing 1 in the RX_i bit location.

0: Not an ISE source.
1: The ISE source is the RX data link.

ABORT_i of DBGISESRCA is the ISE source is an ABORT request by the debugger in the host 1820 or one of the processors 1840a to 1840c. This bit is set by either an abort command from the debugger on the host 1820 (SCAN_RX with PID=1111$_2$) or by a write of a 1 to the respective bit in DBGISECA register of a processor 1840a to 1840c.

0: Not an ISE source.
1: The ISE source is an ABORT event.

Res of DBGISESRCA indicates a reserved bit for future expansion.

When one core 1840a to 1840c reaches a breakpoint, it can break all the other cores or a subset of them. The JTAG controlled ABORT mask register defines which of the processors 1840a to 1840c will be stopped at a general abort. When the core reaches the breakpoint it will write to the DBGABORT register a "1" to the position of all processors 1840a to 1840c it needs to stop (usually all except itself). As a result, an ISE interrupt will be sent to all the processors whose respective bit in the ABORT register is set 1840a to 1840c and their program flow will be interrupted. Note that if the processor is already executing within monitor code, there will be no ISE interrupt and only the ABORT bit will be set. The monitor of each stopped processor will need to respond to the ISE interrupt the next time it polls on DBGISESRCA register. (Note that even though there is a delay in the response here, the application is not running and only monitor code is executed during this window). The purpose of this mechanism is to prevent nested calls to the monitor.

The following describes examples of how the system 1800 may be used for debugging.

EXAMPLE 1

Condition—A processor 1840a is halted and the host 1820 wants to read information from the memory 1842a.

At this point the processor 1840a monitor is waiting for host 1820 commands, usually using a polling loop on the debugger interface module 1841 status registers (and monitoring the DBGISESRCA for ABORT events).

After checking that the TX buffer is not busy by polling the IR status word, the host 1820 sends a message to the core 1820a via the debugger interface module 1841 using the processors PID (RX session). The message contains the command to read memory, with parameters of start address and block length.

The processor 1840*a* reads the status register, identifies that the message is for it (based on the PID match), reads the message, and clears the busy bit to indicate that the buffer is ready for receiving new messages.

After parsing the received command, the processor 1840*a* builds a message block to be sent to the host 1820 via the Txmit channel. (i.e., read the memory+add any required heading or suffix such as checksum). Then the processor 1840*a* attempts to get control of the DBG Tx Link 108, via the lock semaphore. When control is achieved, the first 8-words (or less if the message is shorter) are sent (write data, write length+assert TINT). If the message is longer than 8-words, the above sequence is repeated for the next block, until all of the message is passed.

Some notes:
 a. When doing a polling loop, this is preferably not a tight polling loop, or the bus may be "starved".
 b. If required, it is possible to monitor the receiving monitor for new data, between transmitter blocks.
 c. Messages from other processors may interleave between blocks of the processor message.

EXAMPLE 2

Condition—A first processor 1840*a* is executing an application and a second processor 1840*b* sends an abort. As a result, the first processor 1840*a* gets an ISE interrupt. The first processor reads the DBGISESRCA register and determines that the source of the interrupt is an abort. The first processor 1840*a* sends a notification of "break" and the reason of the break to the debugger on the host 1820 through the Tx link 108.

The debugger now starts communication, looking for information such as the current program counter value (see example 1 for the protocol). When the first Rx message is received (identified by a polling loop on the Rx status register), the ABORT bit in DBGISESRCA register can be cleared by writing 1 to it. Operation of the application by the first processor 1840*a* is resumed when the first processor 1840*a* receives a "go" or "sgo" command from the debugger.

"go"=return from monitor to application. "sgo"=all currently stopped monitors should start running together. Synchronization is achieved by meaans of shared memory or shared semaphore. See application Ser. No. 08/813,501, filed Mar. 7, 1997, entitled INTERFACE CONTROLLER INCLUDING HARDWARE MECHANISM TO HANDLE PS/2 INTERFACE, assigned evenly herewith and incorporated by reference in its entirety.

Note on acquiring the control over the Tx buffer: It may be that the Tx buffer is busy by the same processor when the monitor tries to get control over it. This may be due to some virtual I/O operation. This is identified by a PID that is identical to the processor's PID, which does not change to $1111_2$ after a pause sufficient for the host to read a TX message. When that is identified, the following procedure should be followed:
 =read the data in the buffer and length register.
 release the lock or use the channel for sending the message.
 Before exiting the monitor and after the message was sent, get control over the Lock semaphore, re-load the data and lock to the registers. Return to the application (virtual I/O routine)

General Description

The system requirements in one embodiment for using the debugger interface module 1841 as a multicore development tool are as follows:
 a. All cores should have access to the debugger interface module 1841 registers with the ability to read and write data.
 b. A non-maskable interrupt signal (named here ISE interrupt) should be an input to each of the cores. The circuit is designed to support edge sensitive interrupt inputs (falling or using an inverter a rising edge), but may be enhanced for level sensitive inputs.
 c. If a processor supports low power modes (e.g., stopping or slowing down clocks), a hardware means to wake up the system on the event of a reset or ISE interrupt should be provided (for at least one of the ISE interrupts).
 d. The processors may be connected over one bus or multiple buses. The processors may be identical or different. In the later case, the monitor SW that uses them will be different.

Usage Recommendations

JTAG Performance

For best performance the system 1800 should be the only device in the JTAG scan path. Since the debugger interface is used in the development phase of a product, this not should be a problem. It is suggested to keep the scan path as short as possible.

JTAG Clock Rate

For reliable communication over the JTAG bus, the error probability should be extremely low. To achieve this, one should take into consideration the way the TAP is connected to the JTAG bus controller card. This is especially important when the system operates with a 3V supply and the card with 5V. It is recommended to use transceivers, with the cable, in the following cases: bus speed greater than 0.5 MHz, 3V operation, and cable length greater than 6".

It should be noted that, in some embodiments, erroneous operations by the host may cause a lockout of the communication hardware. Examples for such cases are:

Doing a data scan with a JTAG instruction with PID of a processor that is not in the system.

Doing a SCAN_TX while the PID is $1111_2$.

Execution of a reset instruction is guaranteed to recover from all these locked cases, but this will have the impact of resting the entire chip. These sequences should thus be avoided by the host.

FIG. 16 is a summary of all of the debugger interface module 1841 module registers, and FIG. 17 shows the layout of the debugger interface module 1841 module registers.

APPENDICES:

The following appendices are attached herewith and are to be considered an integral part of this provisional patent application.

1. Emerald Monitor Kernel Software Requirements Document
2. Emerald Monitor Kernel Architecture Design Document
3. Debugging Environment Specification
4. Normandy Functional Specification
5. Debugger Interface Architecture Specification
6. CR32 Monitor Kernel (TMON) for Normandy, Software Requirements Document
TMON for Normandy (tmnorm) Architecture Design Document (ADD)

What is claimed is:

1. A multiprocessor system, comprising:

a plurality of processors configured for intercommunication therewith, each of the plurality of processors executing a portion of a program such that the plurality of intercommunicating processors collectively execute the program, the program including steps for intercommunicating among the plurality of processors to accomplish execution of the program;

a debugger interface that includes interface circuitry to interface the plurality of processors to a debugger that is operating remotely to the multiprocessor system, the debugger interface including:

means for receiving a debugger command from the debugger via a link to the debugger;

debugger command directing means for determining from the debugger command for which of at least one of the plurality of processors the debugger command is intended and for directing the debugger command, via the interface circuitry to the at least one intended processor, means for receiving a processor command from one of the plurality of processors;

processor command directing means for directing the processor command, received from said one processor, via the interface circuitry across the link to the debugger whereby the system is especially suited for debugging software that is collectively executing on the plurality of processors of the multiprocessor system.

2. The multiprocessor system of claim 1, wherein the debugger interface further includes:

aborting means for aborting the processors in response to the debugger command, received from the debugger across the link, being a debugger abort command.

3. The multiprocessor system of claim 2, wherein the aborting means includes interrupt generating means for generating an interrupt to each of the processors.

4. The multiprocessor system of claim 3, wherein the generated interrupt is non-maskable by the processors.

5. The multiprocessor system of claim 2, and further including:

abort mask means for blocking the aborting means from aborting at least one particular processor.

6. The multiprocessor system of claim 5, wherein the aborting means includes interrupt generating means for generating an interrupt to each of the processors and wherein the interrupt is non-maskable by the processors, wherein the abort mask means includes interrupt mask means for preventing the interrupt generating means from generating an interrupt to the particular processors.

7. The multiprocessor system of claim 2, wherein the debugger interface further includes:

means for receiving a processor abort command from one processor of the plurality of processors wherein the aborting means aborts at least one of the plurality of processors responsive to the processor abort command.

8. The multiprocessor system of claim 7, wherein the aborting means includes means for determining from the processor abort command which of the plurality of processors is the at least one processor to be aborted.

9. The multiprocessor system of claim 7, and further comprising:

abort mask means for blocking the aborting means from aborting at least one particular processor.

10. The multiprocessor system of claim 9, wherein the aborting means includes interrupt generating means for generating an interrupt to each of the indicated processors and wherein the interrupt is non-maskable by the processors, and the abort mask means includes interrupt mask means for preventing the interrupt generating means from generating an interrupt to the selected processors.

11. The multiprocessor system of claim 9, wherein the aborting means includes interrupt generating means for generating an interrupt to each of the indicated processors and wherein the interrupt is non-maskable by the processors, and the abort mask means includes interrupt mask means for preventing the interrupt generating means from generating an interrupt to the selected at least one of the processors.

12. The multiprocessor system of claim 1, wherein the processor command directing means includes identifying means for identifying the one processor from which the processor command is received; and indicating means for indicating the processor identifications to the debugger.

13. The multiprocessor system of claim 1, and further comprising:

monitor software corresponding to each processor and executable thereby, wherein the monitor software includes means for causing the processor to generate the processor commands.

14. The multiprocessor system of claim 13, wherein:

each processor includes breakpoint means for detecting a preprogrammed condition of that processor, and the monitor software corresponding to that processor includes processor command generating means for causing the processor to generate the processor command in response to detection of the preprogrammed condition by the breakpoint means.

15. The multiprocessor system of claim 14, wherein the command generated in response to detection of the predetermined condition is an abort processor command, and the multiprocessor system further includes aborting means for aborting at least one processor in response to an abort processor command.

16. The multiprocessor system of claim 15, and further comprising:

abort mask means for blocking the aborting means from aborting a selected at least one of the processors.

17. The multiprocessor system of claim 14, wherein the aborting means includes means for determining from the processor abort command which of the plurality of processors is the at least one processor to be aborted.

18. The multiprocessor system of claim 1, wherein the debugger interface further includes:

locking means for preventing the processor command directing means from directing processor commands from all but a particular one of the plurality of processors to the debugger.

19. The multiprocessor system of claim 1, wherein the multiprocessor system is unitarily formed in an integrated circuit.

20. The multiprocessor system of claim 1, wherein the debugger interface operates according to JTAG standard.

21. The multiprocessor system of claim 20, wherein the debugger interface includes a chain of serial shift registers via which the debugger command directing means directs the debugger command and via which the processor command directing means directs the processor command, and wherein the debugger interface further includes chain length changing means that changes the length of the chain of serial shift registers in accordance with a message length field in the debugger command and the processor command.

22. The multiprocessor system of claim 1, and further including:

interrupt signal generating means for generating an interrupt signal to the debugger to indicate that a processor command has been directed to the debugger.

* * * * *